United States Patent [19]
Alger et al.

[11] 3,963,994
[45] June 15, 1976

[54] SLIT INJECTION DEVICE

[75] Inventors: Terry W. Alger; Leland G. Schlitt; Laird P. Bradley, all of Livermore, Calif.

[73] Assignee: The United States of America as represented by the United States Energy Research and Development Administration, Washington, D.C.

[22] Filed: Jan. 15, 1975

[21] Appl. No.: 541,178

[52] U.S. Cl............................. 331/94.5 PE; 330/4.3
[51] Int. Cl.² ........................................ H01S 3/097
[58] Field of Search...................... 331/94.5; 330/4.3

[56] References Cited
UNITED STATES PATENTS

| | | | |
|---|---|---|---|
| 3,702,973 | 11/1972 | Daugherty et al. | 331/94.5 PE |
| 3,808,551 | 4/1974 | Ahouse | 331/94.5 PE |

*Primary Examiner*—William L. Sikes
*Attorney, Agent, or Firm*—Dean E. Carlson; F. A. Robertson; L. E. Carnahan

[57] ABSTRACT

A laser cavity electron beam injection device provided with a single elongated slit window for passing a suitably shaped electron beam and means for varying the current density of the injected electron beam.

3 Claims, 3 Drawing Figures

SLIT INJECTION DEVICE

BACKGROUND OF THE INVENTION

The invention described herein was made in the course of, or under, Contract No. W-7405-ENG-48 with the U.S. Atomic Energy Commission.

The invention relates to electron beam-excited lasers, and more particularly to an improved device for injecting an electron beam into a gas laser medium and for controlling the current density of the injected electron beam. Electron beam-excited laser systems comprising an electron beam source and an elongated laser cavity containing a gaseous lasing medium to be "transversely" excited are known in the prior art, as exemplified by U.S. Pat. Nos. 3,641,454 issued Feb. 8, 1972; 3,702,973 issued Nov. 14, 1972; 3,789,321 issued Jan. 29, 1974; and 3,808,551 issued Apr. 30, 1974.

At the interface of the electron beam source and the laser cavity, means are required for proper isolation of the large pressure difference thereacross and for the controlled injection of the electron beam into the gas laser medium. A prior art device, the so-called hibachi device, for accomplishing these control functions at the electron beam source and laser cavity interface, has a principal disadvantage of limiting electron beam energy transfer between the beam source and laser cavity to about 50% due to the geometry of the device. Thus, a need exists in the art for a simple, yet effective device for isolating the above-mentioned large pressure difference and for controlling injection of the electron beam into the gas laser medium.

SUMMARY OF THE INVENTION

The present invention provides an improved laser cavity electron beam injection device which overcomes the disadvantages of the prior known beam injection devices by providing a single, relatively long slit which eliminates from the electron beam path the many slit-forming structures of the prior devices, particularly the so-called hibachi device, and is provided with means for varying the current density of the injected electron beam. Yet, the present invention is of sufficient strength to withstand the large pressure difference which exists between the electron beam source and the laser cavity.

Therefore, it is the object of the present invention to provide an improved laser cavity electron beam injection device.

A further object of the invention is to provide means for isolation of the large pressure difference at the interface of the electron beam source and the laser cavity while providing for controlled injection of the electron beam into the gaseous lasing medium.

Another object of the invention is to provide an electron beam injection device having a single, relatively long slit window for passing a suitably shaped electron beam, and means for varying the current density of the injected electron beam.

Other objects of the invention will become readily apparent from the following description and accompanying drawings.

DESCRIPTION OF THE INVENTION

This invention is an improved laser cavity electron beam injection device and broadly consists of a single elongated slit window for passing a suitably shaped electron beam into the laser cavity and means for varying the current density of the injected electron beam.

Figure 1:
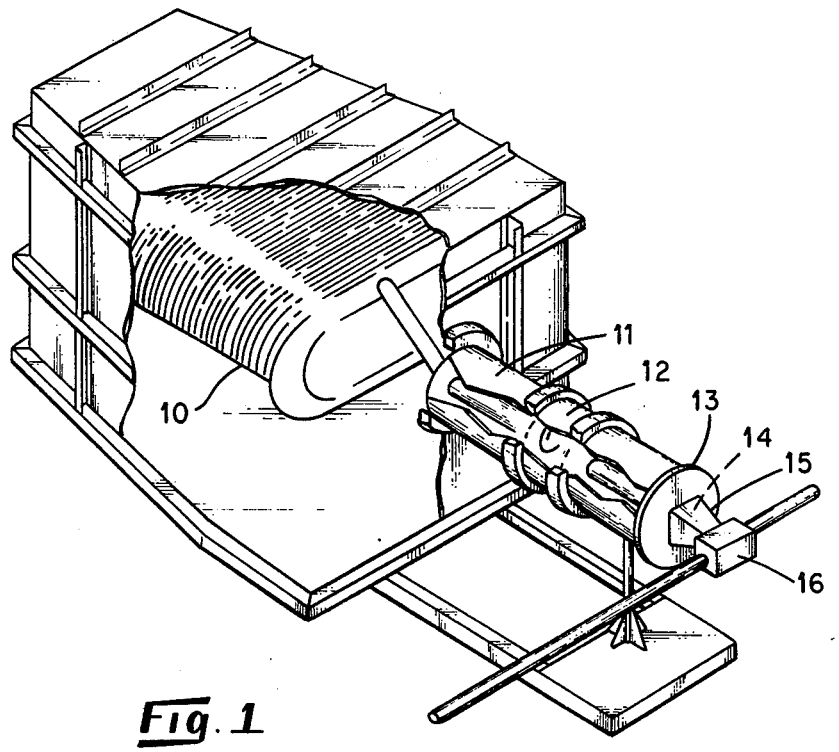
FIG. 1 is a view, partially cut-away, of an electron beam-excited laser system.

FIG. 1 illustrates an electron beam-excited laser system comprising an electron beam source and an elongated laser cavity containing a gaseous medium to be "transversely" excited by the electron beam and broadly consists of a Marx bank (capacitor bank) 10, a pulse forming line 11, a switch 12, a diode source 13 from which an electron beam indicated at 14 is directed through a drift region within a housing 15 into a laser cavity or vessel 16 containing a gaseous lasing medium, such as Ar, Xe, Kr, $CO_2$—N—He, etc. Inasmuch as the details of the FIG. 1 laser system do not constitute part of this invention, further description thereof is deemed unnecessary. However, the diode source 13 of the FIG. 1 laser system is described and claimed in copending U.S. patent application Ser. No. 504,933, filed Sept. 11, 1974, entitled "Relativistic Electron Beam Generator", issued on Nov. 11, 1975 as U.S. Pat. No. 3,919,580, in the name of L. J. Mooney et al and assigned to the same assignee.

At the interface of the electron beam source and the laser cavity (housing 15 and cavity 16), means are required for proper isolation of the large pressure difference thereacross and for the controlled injection of the electron beam into the gaseous lasing medium. In a typical laser system of this type, isolation of the pressure difference between the cavity and beam source is accomplished by a foil window transparent to electron beam energy but of sufficient strength to withstand this large pressure difference. In the prior art, as pointed out above, a commonly used means for controlling the injection of the electron beam into the gaseous lasing medium is the so-called hibachi device illustrated in FIG. 2, and as indicated by legends is composed of a variable carbon aperture composed of a plurality of carbon members having a rectangular cross-section, and a hibachi or grid support composed of members of rectangular cross-section positioned adjacent a foil window through which the electron beam ($e^-$) passes into the laser cavity, the control of the current density being accomplished by movement of the variable carbon aperture to cover or uncover the openings in the hibachi. As clearly seen from the geometry of the FIG. 2 device the electron beam energy transfer between the beam source and the cavity is limited to about 50% due to the rectangular members of the hibachi being physically located adjacent the foil window thereby blocking passage of a portion of the electron beam into the laser cavity.

Figure 2:
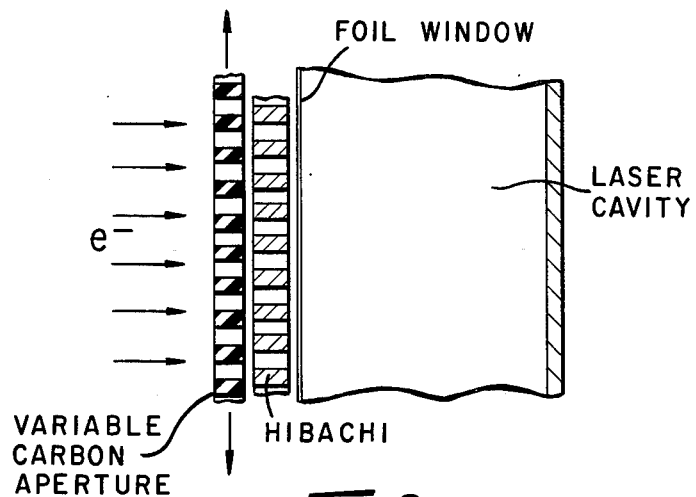
FIG. 2 is a partial cross-sectional view of the so-called hibachi type beam injection device of the prior art.
Figure 3:
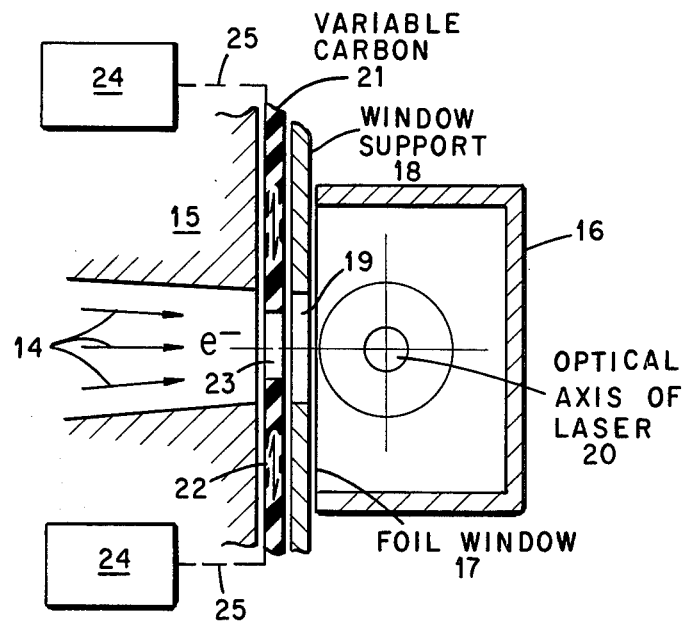
FIG. 3 is a partial view, in cross-section, of the interface of the FIG. 1 laser system between the laser cavity and the electron beam source illustrating the improved beam injection device in accordance with the invention.

The improved electron beam injection device of the present invention is illustrated in FIG. 3, and, as in the prior known device of FIG. 2, a foil window 17 is disposed such as to form one wall of the laser cavity or vessel 16. A window support structure 18 is positioned in abutment with window 17 intermediate housing 15 and laser cavity 16 and is provided with an elongated narrow slit 19 whose long dimension (at right angles to the plane of the figure) is parallel to the long dimension of the laser cavity and in alignment with electron beam 14 as it passes through housing 15 into cavity 16. The optical axis of the laser cavity is indicated at 20. Thus, as opposed to the hibachi configuration of FIG. 2 which utilizes many relatively short, parallel slits, the present device provides a single, relatively long slit and, thereby, eliminates from the electron beam path the many slit-forming structures of the hibachi device providing substantially greater electron beam energy transfer between the beam source 13 and the laser cavity 16. Yet, like the hibachi device of FIG. 2, the device of FIG. 3 is of sufficient strength to withstand the large pressure difference which exists between the electron beam source and the laser cavity.

For example, with a laser cavity 16 containing argon (Ar) as a lasing media and having a length of 60 cm and a volume of 300 cm$^3$, the foil window 17 is constructed of titanium (Ti), such as commercially pure AMS4901, with a thickness of 0.0127 cm, window support 18 is constructed of stainless steel (304S.S.) with a thickness of near 1 cm, and slit 19 having a length of 50 cm and width of 1 cm, the pressure difference between the electron beam 14 and the laser cavity 16 ranging up to 94 atm. for a permanent foil strain near 10%.

Since current density control of the injected electron beam is desired in many applications, and since such control is difficult to achieve by adjusting the electron beam source, the device of FIG. 3 is further provided with a pair of movable members or plates 21 and 22 placed adjacent window support structure 18, and intermediate such structure and housing 15, to define a variable slit-shaped aperture 23 parallel to slit 19 in support structure 18. For example, plate 21 and 22 may be constructed of carbon and have a thickness of 0.5 cm and a length of at least the length of slit 19. Micrometer drive means indicated generally at 24 is connected as indicated at 25 to plates 21 and 22 for selectively adjusting the width of aperture 23, this width, for example, being variable at least as great as the width of the electron beam, typically 0.5 to 1 cm for the above example. As the aperture 23 is narrowed, the total beam current injected into the laser cavity 16, via the slit 19, is reduced. In effect, this reduces the current density per unit length of gain or lasing media.

It can be shown, however, that narrowing of the aperture 23 has negligible effect on the uniformity of illumination of the cavity 16 because of electron scattering effects in the high pressure laser gas. In other words, the effect of the narrow aperture is "smeared out". With the variable aperture means, desired current densities may thus be "dialed in" by a simple adjustment of micrometer means 24.

It has thus been shown that the present invention provides an improved laser cavity electron beam injection device for passing a suitably shaped electron beam into the cavity and for varying the current density of the injected electron beam.

While a particular embodiment of the invention has been illustrated and described, modifications will become apparent to those skilled in the art, and it is intended to cover in the appended claims all such modifications as come within the spirit and scope of the invention.

What we claim is:

1. In an electron beam-excited laser system comprising an elongated laser cavity containing a gaseous lasing medium and having a foil window therein through which a beam from an electron beam source passes transversely to excite the lasing medium; the improvement comprising: a beam injection device positioned intermediate said laser cavity and said electron beam source for passing a suitably shaped electron beam through said foil window into said cavity and for varying the current density of the injected electron beam, said injection device being composed of a member positioned closely adjacent the foil window and functioning as a support structure for said foil window, said member being provided with a single elongated slit therethrough substantially parallel to a longitudinal axis of the laser cavity, and a plurality of movably mounted plate means positioned adjacent said member on a side thereof opposite from the foil window and defining an elongated aperture substantially parallel to said elongated slit in said member, and means for moving said plurality of plate means for varying said elongated aperture.

2. The device defined in claim 1, wherein said plurality of plate means comprises a pair of plates constructed of carbon.

3. The device defined in claim 2, wherein said means for moving said plate means comprises a micrometer drive means operatively connected to each of said pair of plates.

* * * * *